(12) United States Patent
Hein et al.

(10) Patent No.: US 7,789,648 B2
(45) Date of Patent: Sep. 7, 2010

(54) ADJUSTMENT DEVICE FOR ADJUSTING A PITCH BETWEEN A TAKE-OFF PLATE AND A TREATMENT DEVICE OF A MOLDING SYSTEM AND A METHOD FOR USE THEREOF

(75) Inventors: Bernd Rudolf Hein, Palzem (DE); Luc Rommes, Eischen (LU); Tomislav Urac, Toronto (CA); Emad Haroun, Mississauga (CA); Peter Adrian Looije, Newmarket (CA)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 308 days.

(21) Appl. No.: 11/749,390

(22) Filed: May 16, 2007

(65) Prior Publication Data

US 2008/0286396 A1    Nov. 20, 2008

(51) Int. Cl.
*B29B 11/06* (2006.01)
*B29B 11/08* (2006.01)
*B28B 17/00* (2006.01)
*B29C 47/00* (2006.01)

(52) U.S. Cl. .................. 425/190; 425/192 R; 425/547; 425/556; 264/40.5

(58) Field of Classification Search ................ 264/190, 264/192 R, 547, 556; 425/190, 192 R, 547, 425/556
See application file for complete search history.

(56) References Cited

U.S. PATENT DOCUMENTS

| 4,773,839 A | 9/1988 | Case et al. |
| 5,096,405 A | 3/1992 | Pace et al. |
| 6,113,834 A | 9/2000 | Kozai et al. |
| 6,461,556 B1 | 10/2002 | Neter |
| 6,530,158 B2 | 3/2003 | Lagron et al. |
| 7,104,780 B2 | 9/2006 | Domodossola et al. |
| 7,452,199 B2 * | 11/2008 | Eigler et al. ................. 425/190 |
| 2004/0185136 A1 * | 9/2004 | Domodossola et al. ...... 425/547 |

FOREIGN PATENT DOCUMENTS

| WO | 2006039776 A1 | 4/2006 |
| WO | 2008015274 A1 | 2/2008 |

* cited by examiner

*Primary Examiner*—Khanh Nguyen
*Assistant Examiner*—Carson Gross
(74) *Attorney, Agent, or Firm*—Husky Intellectual Property Services

(57) ABSTRACT

According to embodiments of the present invention, there is provided an adjustment device for adjusting a distance between a take-off plate and a treatment device of a molding system and a method for use thereof. More specifically, there is provided a distance adjustment device configured to adjust a distance between a take-off plate coupled to a fixed platen of a molding system and a treatment device coupled to a movable platen of the molding system. The adjustment device comprises a movable platen engagement interface configured for attachment to the movable platen of the molding system; a plenum engagement interface configured for attachment to the treatment device; a distance adjustment mechanism configured to selectively fix a position of the treatment device relative to the movable platen in a desired position.

19 Claims, 6 Drawing Sheets

ADJUSTMENT DEVICE FOR ADJUSTING A PITCH BETWEEN A TAKE-OFF PLATE AND A TREATMENT DEVICE OF A MOLDING SYSTEM AND A METHOD FOR USE THEREOF

FIELD OF THE INVENTION

The present invention generally relates to, but is not limited to, molding systems, and more specifically the present invention relates to, but is not limited to, an adjustment device for adjusting a pitch between a take-off plate and a treatment device of a molding system and a method for use thereof.

BACKGROUND OF THE INVENTION

Molding is a process by virtue of which a molded article can be formed from molding material by using a molding system. Various molded articles can be formed by using the molding process, such as an injection molding process. One example of a molded article that can be formed, for example, from polyethelene terephalate (PET) material is a preform that is capable of being subsequently blown into a beverage container, such as, a bottle and the like.

As an illustration, injection molding of PET material involves heating the PET material (ex. PET pellets, PEN powder, PLA, etc.) to a homogeneous molten state and injecting, under pressure, the so-melted PET material into a molding cavity defined, at least in part, by a female cavity piece and a male core piece mounted respectively on a cavity plate and a core plate of the mold. The cavity plate and the core plate are urged together and are held together by clamp force, the clamp force being sufficient enough to keep the cavity and the core pieces together against the pressure of the injected PET material. The molding cavity has a shape that substantially corresponds to a final cold-state shape of the molded article to be molded. The so-injected PET material is then cooled to a temperature sufficient to enable ejection of the so-formed molded article from the mold. When cooled, the molded article shrinks inside of the molding cavity and, as such, when the cavity and core plates are urged apart, the molded article tends to remain associated with the core piece. Accordingly, by urging the core plate away from the cavity plate, the molded article can be demolded, i.e. ejected off of the core piece. Ejection structures are known to assist in removing the molded articles from the core halves. Examples of the ejection structures include stripper plates, ejector pins, etc.

One consideration for economical operation of the molding system is cycle time or, in other words, time that elapses between a point in time when the cavity and core halves are closed and the molded articles are formed and a subsequent point in time when they are opened and the molded articles are removed. As one will appreciate, the shorter the cycle time, the higher the number of molded articles that can be produced in a particular mold in a given time. One attempt to minimize the cycle time is a so-called "post-mold cooling" process. Generally speaking, the post-mold cooling process involves removing the molded articles from the mold once they are sufficiently cooled to enable ejection of the molded articles without causing significant deformation to the molded articles during its transfer to an auxiliary cooling structure. Post mold cooling then occurs independently (but in parallel) to the injection cycle of the molding machine.

An example of the auxiliary cooling structure is disclosed in a commonly owned U.S. Pat. No. 7,104,780 issued to Domodossola et al. on Sep. 12, 2006. More specifically, Domodossola et al. discloses a platen-mounted, post-mold cooling apparatus for handling molded parts in an injection molding machine having a fixed platen, a movable platen, a core half, and a cavity half. A take-off device coupled to the fixed platen is configured to remove molded parts from either the core half or the cavity half. A treatment device coupled to the movable platen is configured to cool the molded parts carried by the take-off device. The take-off device extracts the just molded parts from the mold's core half and then moves linearly outboard of the mold halves. The subsequent movement of the movable platen to close the mold in the next molding cycle causes the treatment device's pins to engage the molded parts in the take-off device part carriers. When the movable platen opens again, the molded parts are extracted from the part carriers by the treatment device pins. When the movable platen is fully open, the treatment device is rotated to eject the cooled parts from the machine.

As will be appreciated by those of skill in the art, a pitch or a distance between the take-off device and the treatment device corresponds to a size of a molded article (such as a preform, for example) being produced. Due to various business considerations, an entity operating the molding system may choose to re-configure the molding system, for example, to change the shape and/or size of the preform to be produced. For example, the entity operating the molding system may choose to change molding cavities (for example, by exchanging mold cavity inserts, etc.) to produce preforms having a larger length or a smaller length. Should this occur, the entity operating the molding system will need to adjust the distance between the take-off device and the treatment device to accommodate the increased (or decreased) length of the molded articles (i.e. the preforms). A traditional solution to adjusting distance between the take-off plate and the treatment device is the use of either (i) a bolster plate or (ii) an adapter plate. The bolster plate has been traditionally attached between the movable platen and the treatment device; and has been used to increase the distance between the take-off plate and the treatment device, while the adapter plate comprises a bracket device which has been traditionally attached to the take-off plate to decrease the distance between the take-off plate and the treatment device.

One of the problems associated with this prior art approach is the time required to change the distance between the take-off plate and the treatment device by having to assemble and/or disassemble the bolster plate and/or the adapter plate. Another disadvantage of this prior art solution is increased costs attributed to the material cost associated with producing the bolster plate and/or adapter plate.

SUMMARY OF THE INVENTION

According to a first broad aspect of the present invention, there is provided a distance adjustment device configured to adjust a distance between a take-off plate coupled to a fixed platen of a molding system and a treatment device coupled to a movable platen of the molding system. The distance adjustment device comprises a body defining: a movable platen engagement interface configured for attachment to the movable platen; a plenum engagement interface configured for attachment to the treatment device; a distance adjustment mechanism configured to selectively fix a position of the treatment device relative to the movable platen in a desired position.

According to a second broad aspect of the present invention, there is provided a method for adjusting a distance between a take-off plate coupled to a fixed platen of a molding system and a treatment device coupled to a movable platen of the molding system, the method implemented in a distance adjustment device comprising (a) a movable platen engagement interface configured for attachment to the movable platen of the molding system; (b) a plenum engagement interface configured for attachment to the treatment device; (c) a distance adjustment mechanism configured to selectively fix a position of the treatment device relative to the movable platen in a desired position. The method comprises actuating the distance adjustment mechanism to a sliding arrangement; selecting the desired position of the treatment device relative to the movable plate; actuating the distance adjustment mechanism to a locked arrangement to lock the treatment device relative to the movable plate in the desired position.

According to a third broad aspect of the present invention, there is provided a molding system of a type having a movable platen and a fixed platen. The molding system comprises a take-off plate coupled to the fixed platen; a treatment device coupled to the movable platen; the take-off plate and the treatment device being separated by a distance; a distance adjustment device comprising a body defining a movable platen engagement interface configured for attachment to the movable platen; a plenum engagement interface configured for attachment to the treatment device; a distance adjustment mechanism configured to selectively fix a position of the treatment device relative to the movable platen in a desired position.

According to another broad aspect of the present invention, there is provided a distance adjustment device for use in a molding system having a take-off plate coupled to a fixed platen of a molding system and a treatment device coupled to a movable platen of the molding system, the take-off plate and the treatment device being separated by a distance. The distance adjustment device comprises means for attachment to the movable platen; means for attachment to the treatment device; means for selectively adjusting the distance between the treatment device and the movable platen.

A technical effect, amongst others, of the aspects of the present invention may include time savings associated with changing the distance between the take-off plate and the treatment device. Another technical effect of the aspects of the present invention may include decreased costs associated with producing a device that is used to adjust the distance between the take-off plate and the treatment device. It should be expressly understood that not all of the technical effects, in their entirety, need be realized in each and every embodiments of the present invention.

DESCRIPTION OF THE DRAWINGS

A better understanding of the embodiments of the present invention (including alternatives and/or variations thereof) may be obtained with reference to the detailed description of the exemplary embodiments along with the following drawings, in which.

The drawings are not necessarily to scale and are may be illustrated by phantom lines, diagrammatic representations and fragmentary views. In certain instances, details that are not necessary for an understanding of the exemplary embodiments or that render other details difficult to perceive may have been omitted.

DETAILED DESCRIPTION OF EMBODIMENTS

Figure 1:
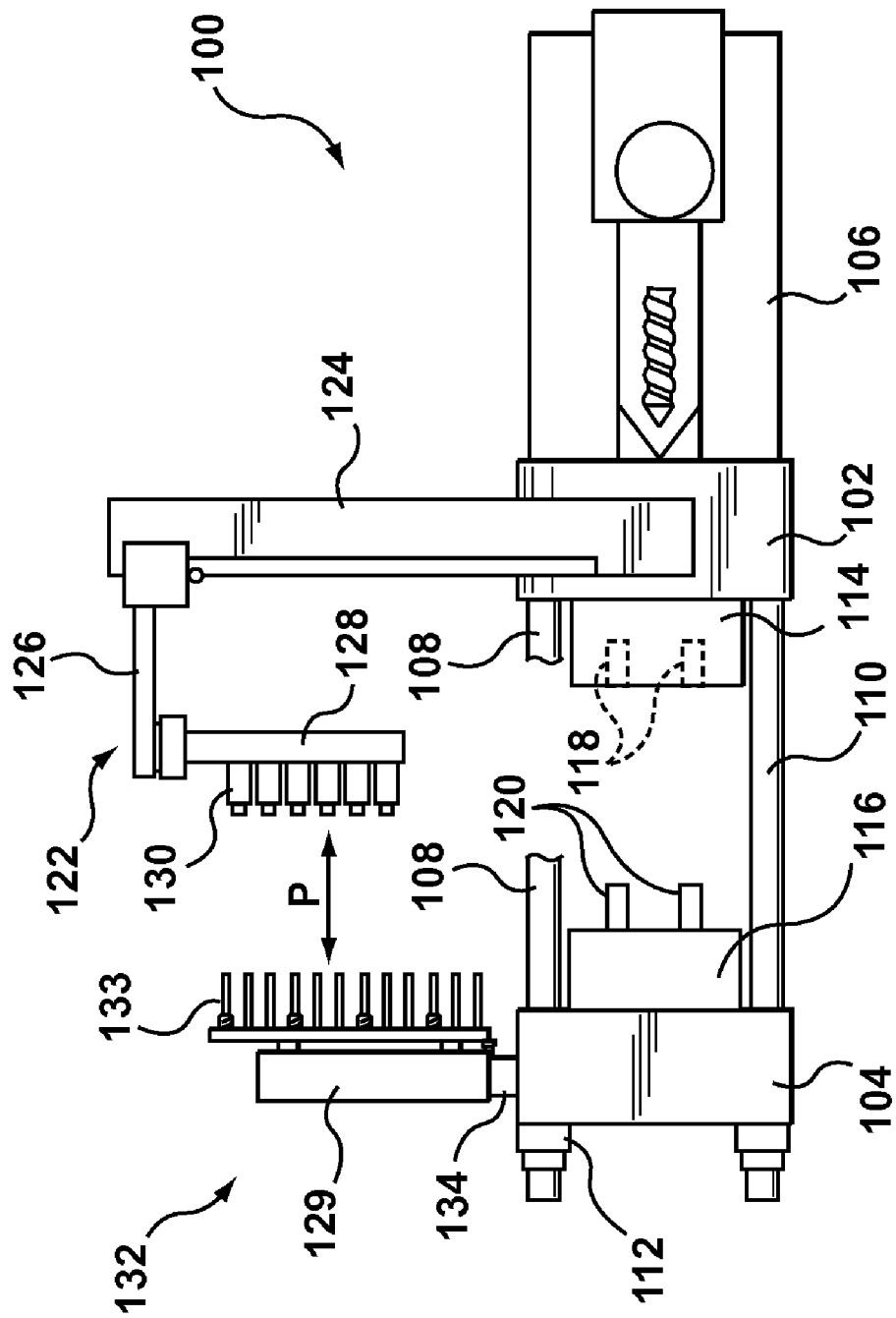
FIG. 1 is a schematic representation of a molding system 100 according to a non-limiting embodiment of the present invention.

With reference to FIG. 1, there is depicted a non-limiting embodiment of a molding system 100 which can be adapted to implement embodiments of the present invention. For illustration purposes only, it shall be assumed that the molding system 100 comprises an injection molding system for processing molding material, such as, PET for example. However, it should be understood that in alternative non-limiting embodiments, the molding system 100 may comprise other types of molding systems, such as, but not limited to, compression molding systems, metal molding systems and the like. It should be further understood that embodiments of the present invention are applicable to the molding system 100 incorporating any multicavitation mold, including PET molds, thinwall articles molds, closures molds and the like.

Within the non-limiting embodiment of FIG. 1, the molding system 100 comprises a fixed platen 102 and a movable platen 104. The molding system 100 further comprises an injection unit 106 for plasticizing and injection of molding material. In operation, the movable platen 104 is moved towards and away from the fixed platen 102 by means of stroke cylinders (not shown) or any other suitable means. Clamp force (also referred to as closure or mold closure tonnage) can be developed within the molding system 100, for example, by using tie bars 108, 110 and a tie-bar clamping mechanism 112, as well as (typically) an associated hydraulic system (not depicted) that is usually associated with the tie-bar clamping mechanism 112. It will be appreciated that clamp tonnage can be generated using alternative means, such as, for example, using a toggle-clamp arrangement (not depicted) or the like.

A first mold half 114 can be associated with the fixed platen 102 and a second mold half 116 can be associated with the movable platen 104. In the specific non-limiting embodiment of FIG. 1, the first mold half 114 comprises one or more mold cavities 118. As will be appreciated by those of skill in the art, the one or more mold cavities 118 may be formed by using suitable mold inserts or any other suitable means. As such, the first mold half 114 can be generally thought of as a "mold cavity half". The second mold half 116 comprises one or more mold cores 120 complementary to the one or more mold cavities 118. As will be appreciated by those of skill in the art, the one or more mold cores 120 may be formed by using suitable mold inserts or any other suitable means. As such, the second mold half 116 can be generally thought of as a "mold core half".

The first mold half 114 can be coupled to the fixed platen 102 by any suitable means, such as a suitable fastener (not depicted) or the like. The second mold half 116 can be coupled to the movable platen 104 by any suitable means, such as a suitable fastener (not depicted) or the like. It should be understood that in an alternative non-limiting embodiment of the present invention, the position of the first mold half 114 and the second mold half 116 can be reversed and, as such, the first mold half 114 can be associated with the movable platen 104 and the second mold half 116 can be associated with the fixed platen 102.

In an alternative non-limiting embodiments of the present invention, the fixed platen 102 need not be stationary and may as well be moved in relation to other components of the molding system 100.

FIG. 1 depicts the first mold half 114 and the second mold half 116 in a so-called "mold open position" where the movable platen 104 is positioned generally away from the fixed platen 102 and, accordingly, the first mold half 114 is positioned generally away from the second mold half 116. For example, in the mold open position, a molded article (not depicted) can be removed from the first mold half 114 and/or the second mold half 116. In a so-called "mold closed position" (not depicted), the first mold half 114 and the second mold half 116 are urged together (by means of movement of the movable platen 104 towards the fixed platen 102) and cooperate to define (at least in part) a molding cavity (not depicted) into which the molten plastic (or other suitable molding material) can be injected, as is known to those of skill in the art. It should be appreciated that one of the first mold half 114 and the second mold half 116 can be associated with a number of additional mold elements, such as for example, one or more leader pins (not depicted) and one or more leader bushings (not depicted), the one or more leader pins cooperating with one more leader bushings to assist in alignment of the first mold half 114 with the second mold half 116 in the mold closed position, as is known to those of skill in the art.

The molding system 100 can further comprise a robot 122 operatively coupled to the fixed platen 102. Those skilled in the art will readily appreciate how the robot 122 can be operatively coupled to the fixed platen 102 and, as such, it will not be described here in any detail. The robot 122 comprises a mounting structure 124, an actuating arm 126 coupled to the mounting structure 124 and a take-off plate 128 coupled to the actuating arm 126. The take-off plate 128 comprises a plurality of molded article receptacles 130. Generally speaking, the purpose of the plurality of molded article receptacles 130 is to remove molded articles from the one or more mold cores 120 (or the one or more mold cavities 118) and/or to implement post mold cooling of the molded articles. In the specific non-limiting example being illustrated herein, the plurality of molded article receptacles 130 comprises a plurality of cooling tubes for receiving a plurality of molded preforms. However, it should be expressly understood that the plurality of molded article receptacles 130 may have other configurations. The exact number of the plurality of molded article receptacles 130 is not particularly limited. For example, if a three-position post mold cooling cycle is to be implemented and if the molding system 100 comprises 72 instances of the one or more mold cavities 118 (for example, 12 rows of 6), the take-off plate 128 can comprise 216 instances of the plurality of molded article receptacles 130 (i.e. twelve rows of 18). Other configurations are, of course, also possible and are only limited by business considerations of an entity managing the molding system 100.

The molding system 100 further comprises a treatment device 132 operatively coupled to the movable platen 104. Those skilled in the art will readily appreciate how the treatment device 132 can be operatively coupled to the movable platen 104 and, as such, it will not be described here in any detail. The treatment device 132 comprises a mounting structure 134 used for coupling the treatment device 132 to the movable platen 104. The treatment device 132 further comprises a plenum 129 coupled to the mounting structure 134. Coupled to the plenum 129 is a plurality of treatment pins 133. The number of instances of the plurality of treatment pins 133 generally corresponds to the number of instances of the plurality of molded article receptacles 130.

Generally speaking, the purpose of the plenum 129 is to supply services (such as, for example, vacuum and/or air stream) to the plurality of treatment pins 133. Briefly referring to FIG. 2, the plenum 129 comprises an air management device 240, such as for example, an air blower and the like. Returning to the description of FIG. 1, in some embodiments of the present invention, the plenum 129 can further comprise a rotating mechanism (not separately depicted in FIG. 1) that rotates the plenum 129 relative to the movable platen 104 to dislodge molded articles disposed on at least some of the plurality of treatment pins 133. Accordingly, the purpose of the plurality of treatment pins 133 can include some or all of: (i) engaging molded articles received in the plurality of molded article receptacles 130 and to provide air to cool the molded articles from within; (ii) to remove the molded articles from the plurality of molded article receptacles 130; and (iii) to eject the molded articles onto a conveyor belt or onto any other suitable means. It should be noted that some of the plurality of treatment pins 130 may perform some or all of the functions recited above. For example, in some embodiments of the present invention, certain occurrences of the plurality of treatment pins 133 may exclusively execute a cooling function, while others may exclusively execute an ejection function. In alternative non-limiting embodiments of the present invention, all instances of the plurality of treatment pins 133 may perform both the cooling and the ejection functions.

The take-off plate 128 and the plenum 129 can be said to be separated by a distance depicted in FIG. 1 at "P". In other words, the distance "P" is a distance between the take-off plate 128 and the plenum 129.

Naturally, the molding system 100 may comprise a number of additional components, such as a hot runner (not depicted) associated, for example, with the fixed platen 102. Furthermore, the molding system 100 may optionally or additionally comprise auxiliary equipment (not depicted), such as dehumidifiers, heaters and the like. All this equipment is known to those of skill in the art and, as such, will not be discussed at any length here. It should be expressly understood that the molding system 100 may have other configurations and the description presented above has been provided as an example only and is not intended to be limiting in any form. In other non-limiting embodiments of the present invention, the molding system 100 can have other configurations with more or fewer components.

Figure 2:
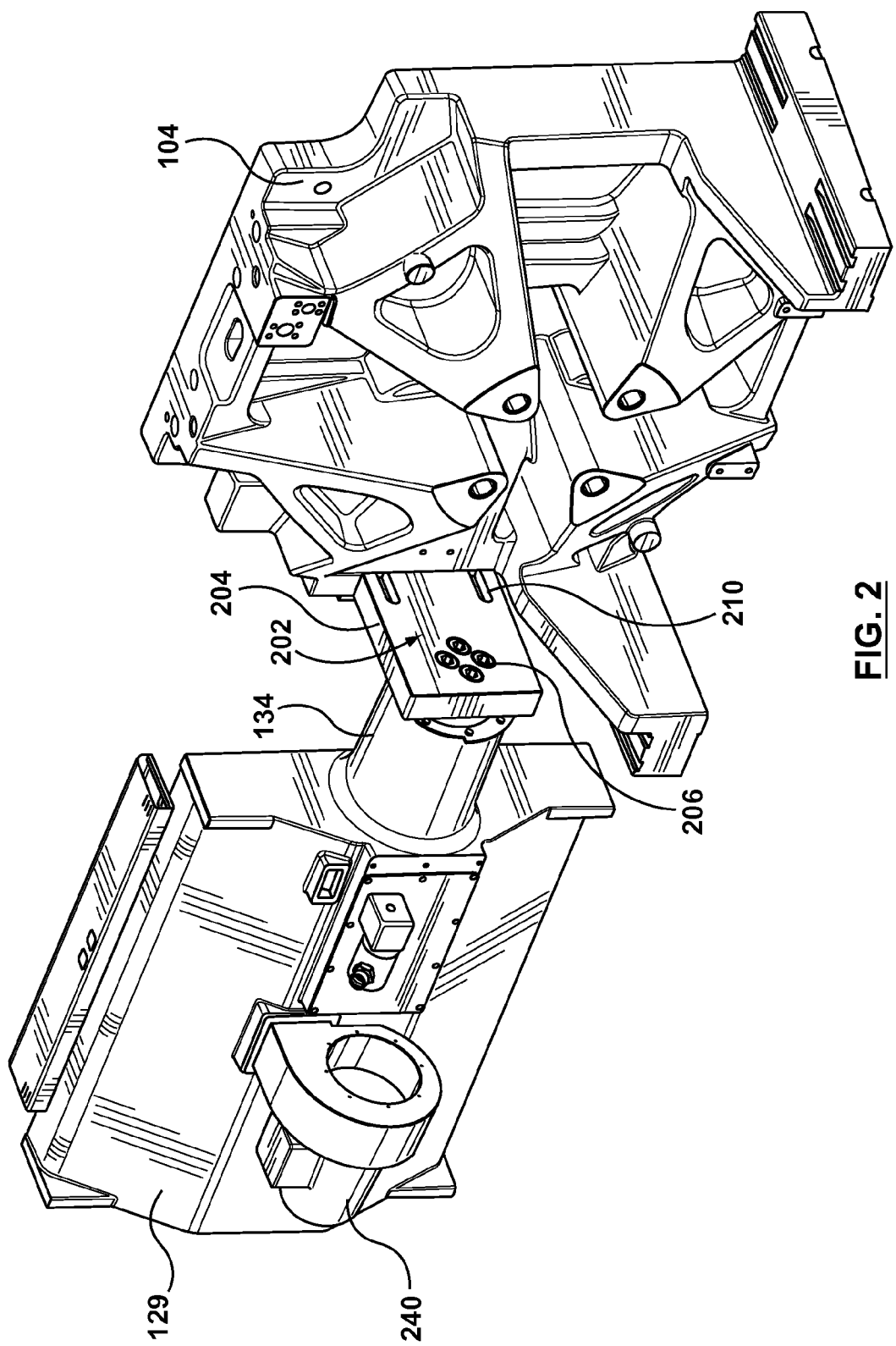
FIG. 2 depicts a perspective view of a portion of the molding system 100 of FIG. 1, showing a distance adjustment device according to a non-limiting embodiment of the present invention.
Figure 3:
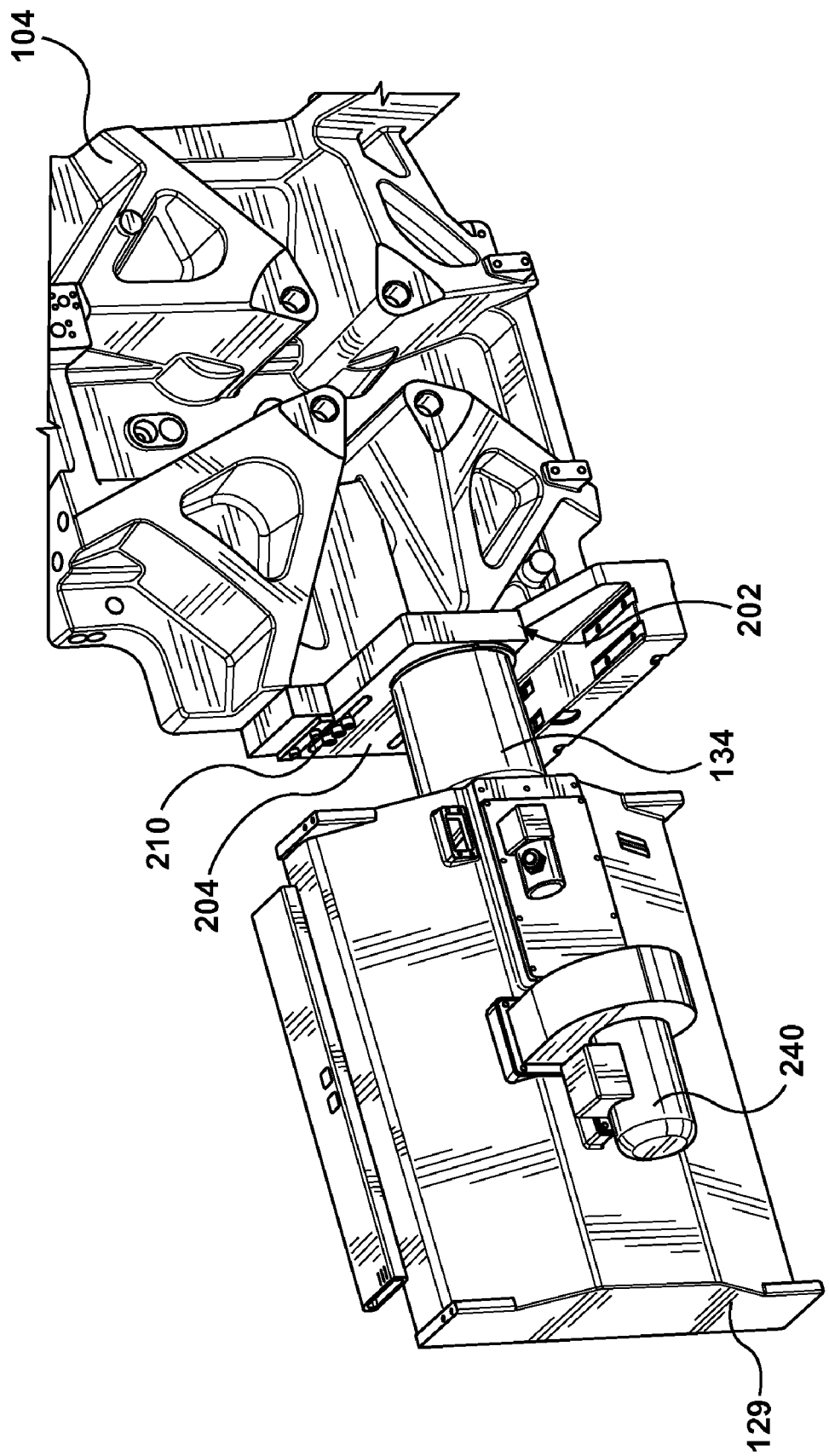
FIG. 3 depicts another perspective view of the portion of the molded system 100 of FIG. 2.
Figure 4:
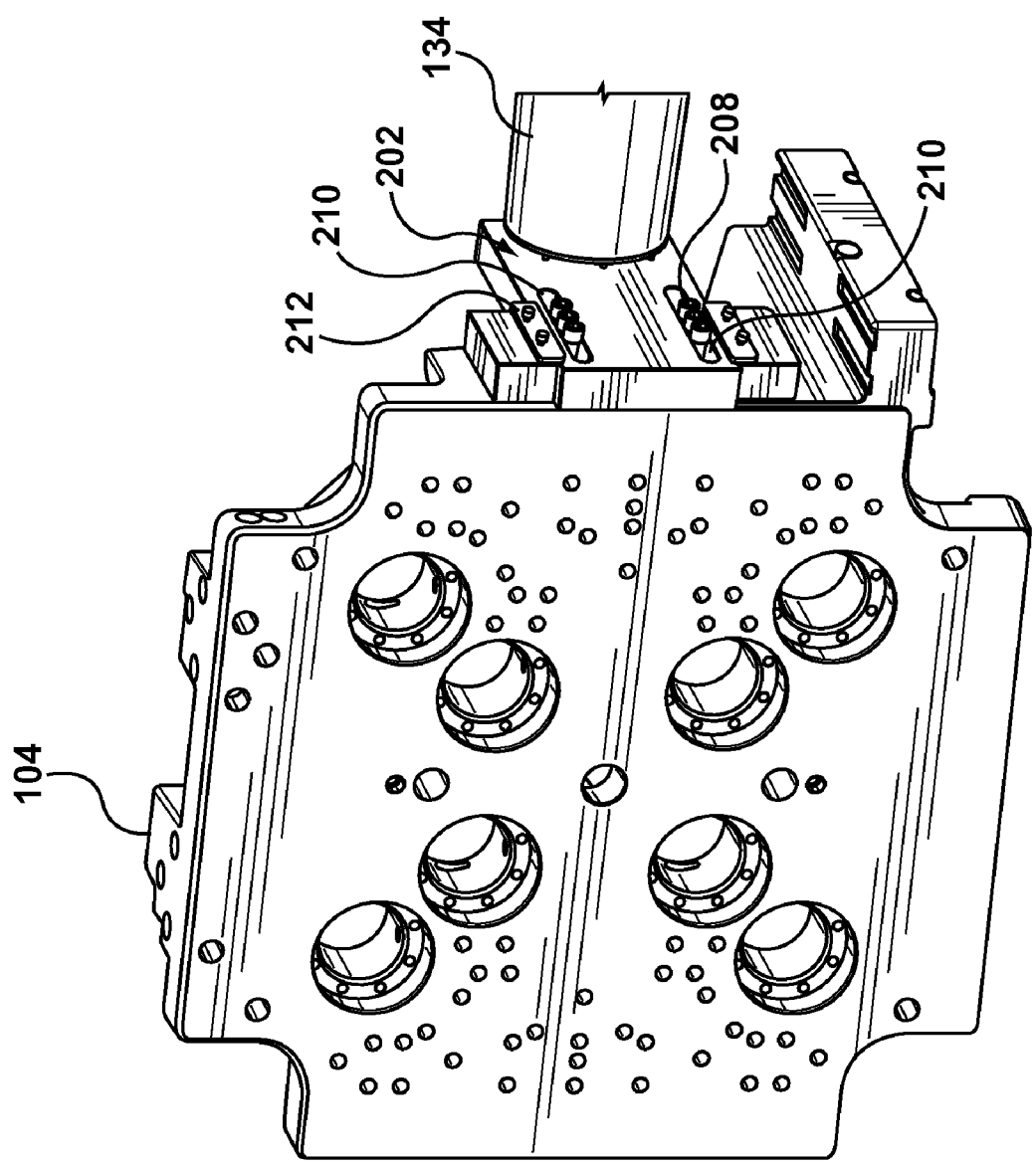
FIG. 4 depicts yet another perspective view of the portion of the molded system 100 of FIG. 2.

With reference to FIGS. 2-4, which depict a portion of the molding system 100 with like numerals depicting like elements, a non-limiting embodiment of a distance adjustment device will now be described in greater detail. More specifically, with reference to FIGS. 2-4, there is depicted the plenum 129, the movable platen 104 and the mounting structure 134. There is also depicted a distance adjustment device 202 according to a non-limiting embodiment of the present invention. The distance adjustment device 202 comprises a body 204, which in the specific embodiment depicted, is substantially rectangular. The body 204 comprises a plenum engagement interface 206. In the specific embodiment being described herein, the plenum engagement interface 206 comprises a plurality of bores defined in the body 204, a plurality of corresponding bores defined in the mounting structure 134 and a set of complementary fasteners. It should be, however, understood that other types of the plenum engagement interface 206 can be used, which can comprise a permanent or removable coupling.

The body 204 further comprises a movable platen engagement interface 208 and a distance adjustment mechanism 210. In the specific non-limiting embodiment being presented herein, the distance adjustment mechanism 210 comprises two slots defined through the body 204 and the movable platen engagement interface 208 comprises a plurality of fasteners that engage the movable platen 104 through the two slots. Within these embodiments of the present invention, the movable platen engagement interface 208 and the distance adjustment mechanism 210 cooperate to selectively fix the position of the plenum 129 relative to the movable platen 104 in a desired position. It should be noted that in alternative non-limiting embodiments of the present invention, the number of slots can be different and, as such, the movable platen engagement interface 208 can be said to comprise at least one slot.

The distance adjustment device 202 further comprises a locking arrangement 212, which in this specific embodiment, comprises two retaining bars secured to the movable platen 104 by means of fasteners (such as bolts and the like). In some embodiments of the present invention, the locking arrangement 212 provides a safeguard by providing auxiliary locking of the body 204 to the movable platen 104. It should be noted that in alternative embodiments of the present invention, the locking arrangement 212 can be implemented differently or omitted altogether.

When it is desirable to adjust the position of the plenum 129 relative to the movable platen 104, a technician (or another representative of an entity managing the molding system 100), first, loosens the plurality of fasteners that constitute the movable platen engagement interface 208 (to actuate the distance adjustment device 202 into a sliding arrangement). The plenum 129 is then adjusted to the desired position by sliding the plurality of fasteners along the two slots that constitute the distance adjustment mechanism 210. Next, once at the desired position, the technician (or another representative of an entity managing the molding system 100) fastens the plurality of fasteners that constitute the movable platen engagement interface 208 208 (to actuate the distance adjustment device 202 into a locked arrangement) and, therefore, fixes the position of the plenum 129 relative to the movable platen 104. Accordingly, the distance "P" between the plenum 129 and the take-off plate 128 can be adjusted. A technical effect of these embodiments of the present invention may include ability to accommodate production of preforms having a different length.

Figure 5:
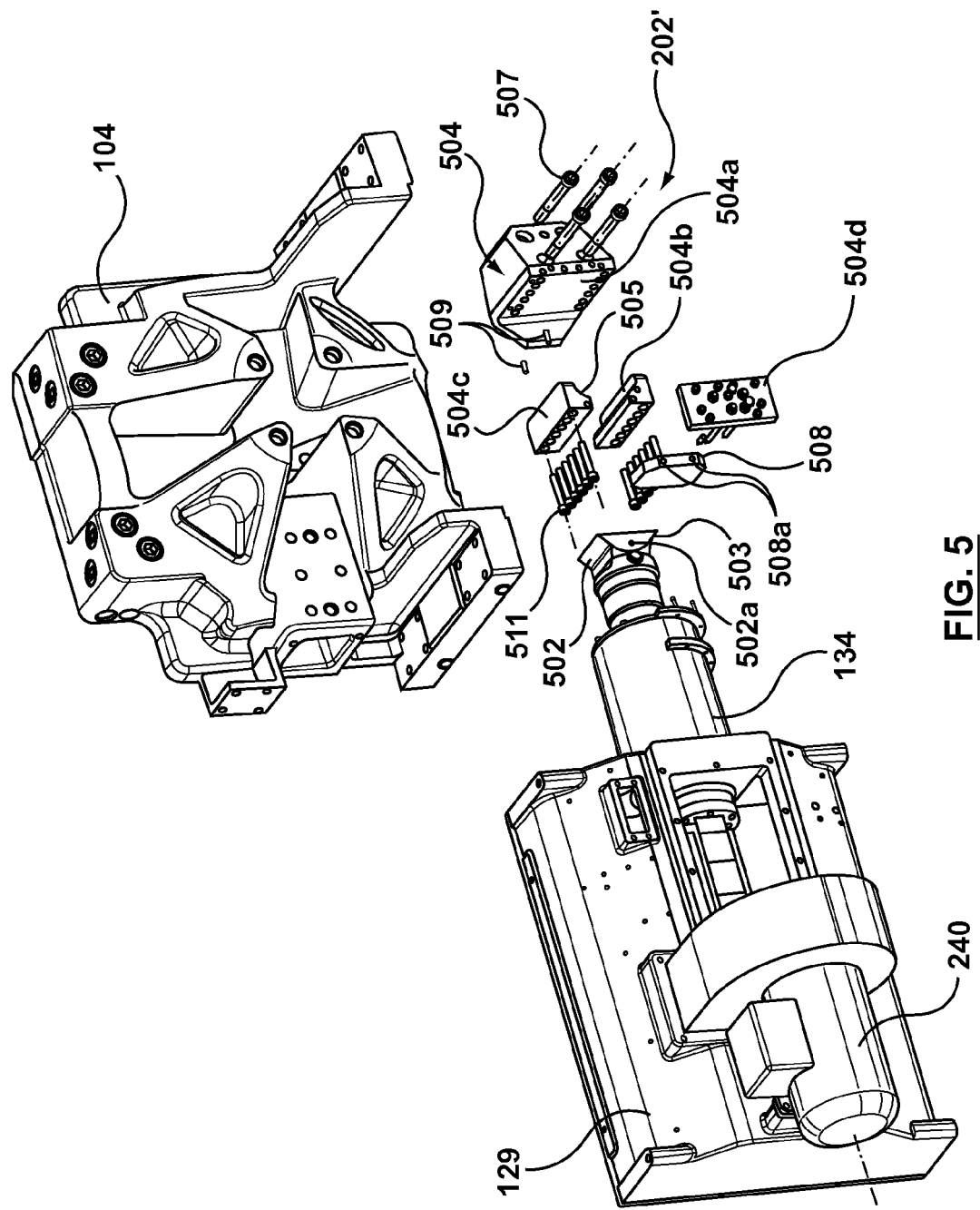
FIG. 5 depicts an exploded perspective view of a portion of the molding system 100 of FIG. 1, depicting a distance adjustment device according to another non-limiting embodiment of the present invention.
Figure 6:
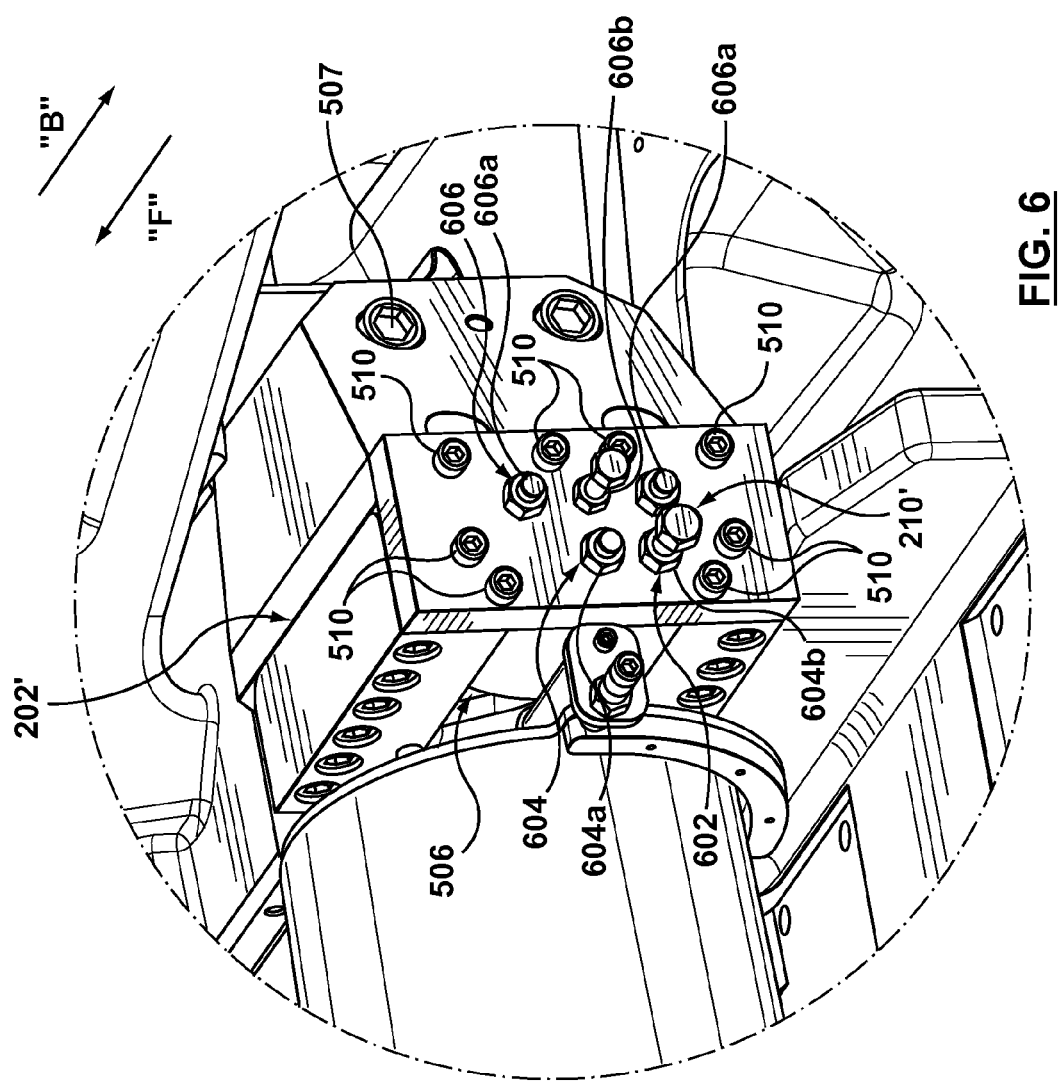
FIG. 6 depicts a portion of the molding system 100, showing the distance adjustment device of FIG. 6 in an assembled arrangement.

With reference to FIGS. 5-6, which depict a portion of the molding system 100 with like numerals depicting like elements, another non-limiting embodiment of a distance adjustment device will now be described in greater detail. More specifically, with reference to FIGS. 5-6, there is depicted the plenum 129, the movable platen 104 and the mounting structure 134. There is also depicted a distance adjustment device 202' according to a non-limiting embodiment of the present invention.

The distance adjustment device 202' comprises a shaft 502 coupled to the mounting structure 134 of the plenum 129. The shaft 502 comprises an end portion 503, which in this specific example comprises a tapered portion (i.e. outwardly extending male taper). However, this need not be so in every embodiment of the present invention and the end portion 503 may be realized in other configurations, as will be appreciated by those of skill in the art. Within these embodiments of the present invention, the shaft 502 can be said to constitute a plenum engagement interface. The distance adjustment device 202' further comprises a bracket mechanism 504. In the specific example being described herein the bracket mechanism 504 comprises a bracket body 504a, a first bracket slide 504b and a second bracket slide 504c. The first bracket slide 504b and the second bracket slide 504c are coupled to the bracket body 504a by means of a plurality of fasteners 511, which can comprise bolts and the like. Additionally, the plurality of fasteners 511 can comprise one or more positioning members, such as one or more dowels 509 and the like. The bracket mechanism 504 further comprises a side plate 504d. The side plate 504d can be coupled to the first bracket slide 504b and the second bracket slide 504c, as well as the bracket body 504a by means of suitable fasteners, such as a plurality of bolts 510 (as is best seen in FIG. 6). It should be expressly understood that the exact number of the plurality of bolts 510 used is not particularly limited. It should be further understood that other type of suitable fasteners can be used.

In alternative embodiments of the present invention, the bracket body 504a, the first bracket slide 504b and the second bracket slide 504c can comprise a unitary structure with the side plate 504d being attached thereto by means of fasteners. Further alternative implementations are, of course, possible. The bracket mechanism 504 can be attached to the movable platen 104 by any suitable means, such as, for example, a plurality of fasteners 507 (such as bolts and the like). Within these non-limiting embodiments of the present invention, the plurality of fasteners 507 and the associated bores defined in the bracket body 504a and the movable platen 104 can be thought of as a movable platen engagement interface.

As is best seen in FIG. 5, the first bracket slide 504b and the second bracket slide 504c comprises an internal engagement surface 505 that is shaped complementary to the end portion 503 of the shaft 502. Within the specific non-limiting embodiment being depicted herein, the internal engagement surface 505 comprises an internal taper. The bracket mechanism 504 and, more specifically the bracket body 504a, the internal engagement surface 505 of the first bracket slide 504b and the internal engagement surface 505 of the second bracket slide 504c, define a sliding slot 506 (as is best seen in FIG. 6).

The distance adjustment device 202' further comprises a locking member 508. In the specific non-limiting embodiment being described herein, the locking member 508 comprises a wedge, which is complementary is size and shape to the sliding slot 506. More specifically, the locking member 508 is shaped in such a way so that it can, in use, be received, together with the end portion 503 of the shaft 502 within the sliding slot 506. Furthermore, it can be said that the locking member 508 can be actuated between two arrangements—a sliding arrangement and a locked arrangement. How the locking member 508 is actuated between the sliding arrangement and the locked arrangement will be described in greater detail herein below. For the time being, suffice it to say that when the locking member 508 is in the sliding arrangement, it allows the end portion 503 of the shaft 502 to be slid along the sliding slot 506 and, more specifically, along the internal engagement surface 505 of the first bracket slide 504b and the second bracket slide 504c. On the other hand, when the locking member 508 is in the locked arrangement, it wedges the end portion 503 of the shaft 502 against the internal engagement surface 505 of the first bracket slide 504b and the second bracket slide 504c. Effectively, in the locked arrangement, the locking member 508 fixes a position of the shaft 502 vis-à-vis the movable platen 104, as will be described in greater detail herein below.

With further reference to FIG. 6, another non-limiting embodiment of a distance adjustment mechanism 210' will now be described in greater detail. Within these non-limiting embodiments of the present invention, the distance adjustment mechanism 210' comprises a plurality of distance adjustment actuators 602. More specifically, the plurality of distance adjustment actuators 602 comprises a shaft adjustment actuators 604 and a locking member adjustment actuators 606. The shaft adjustment actuators 604 comprise a first shaft adjustment actuator 604a and a second shaft adjustment actuator 604b. The first shaft adjustment actuator 604a can comprise a stud and a bolt and the second shaft adjustment actuator 604b can comprise a bolt and a nut. An end of the first shaft adjustment actuator 604a opposite to an end depicted in FIG. 6, engages a portion of the shaft 502 shown in FIG. 5 at 502A. This engagement can be implemented in any known way to permanently attach the end of the first shaft adjustment actuator 604a to the shaft 502. For example, in some embodiments of the present invention, the portion of the shaft 502 can comprises a threaded bore and an adhesive (such as, for example, LOCTITE) can be applied to the end of the first shaft adjustment actuator 604a. However, other suitable type of engagement can be used, such as other types of adhesives and the like. In yet further non-limiting embodiments, the end of the first shaft adjustment actuator 604a and the portion of the shaft 502 can be welded together and the like.

An end of the second shaft adjustment actuator 604b opposite to an end depicted in FIG. 6, simply abuts a portion of the shaft 502. Within these embodiments of the present invention, by turning the nut of the first shaft adjustment actuator 604a clockwise, the shaft 502 can be actuated in a direction depicted in FIG. 6 at "B". Effectively, the first shaft adjustment actuator 604a "pulls" the shaft 502 in the direction "B". By turning the bolt of the second shaft adjustment actuator 604b clockwise, the shaft 502 can be actuated in a direction depicted in FIG. 6 at "F". Effectively, the second shaft adjustment actuator 604b "pushes" the shaft 502 in the direction "F". In an alternative non-limiting embodiment of the present invention, only the first shaft adjustment actuator 604a comprises a bolt and a nut, whereby the second shaft adjustment actuator 604b comprises a bolt (not depicted).

The locking member adjusting actuators 606 comprise a first locking member adjustment actuator 606a and a second locking member adjustment actuator 606b. The first locking member adjustment actuator 606a can comprise two instances of a stud and a nut and the second locking member adjustment actuator 606b can comprise a bolt and a nut. In an alternative non-limiting embodiment of the present invention, the second locking member adjustment actuator 606b can comprise just a bolt. In yet further alternative non-limiting embodiments of the present invention, the first locking member adjustment actuator 606a can comprise a single instance of a stud and a nut.

An end of the first locking member adjustment actuator 606a opposite to an end depicted in FIG. 6, engages a portion of the locking member 508 shown in FIG. 5 at 508A. This engagement can be implemented in any known way to permanently attach the end of the first locking member adjustment actuator 606a to the locking member 508. For example, in some embodiments of the present invention, the locking member 508 can comprises a threaded bore and an adhesive (such as, for example, LOCTITE) can be applied to the end of the first locking member adjustment actuator 606a. However, other suitable type of engagement can be used, such as other types of adhesives and the like. In yet further non-limiting embodiments, the end of the first locking member adjustment actuator 606a and the locking member 508 can be welded together and the like.

An end of the second locking member adjustment actuator 606b opposite to an end depicted in FIG. 6, simply abuts a portion of the locking member 508. Within these embodiments of the present invention, by turning the nut of the first locking member adjustment actuator 606a clockwise, the locking member 508 can be actuated in a direction depicted in FIG. 6 at "B". By turning the bolt of the second locking member adjustment actuator 606b clockwise, the locking member 508 can be actuated in a direction depicted in FIG. 6 at "F".

Within these non-limiting embodiments of the present invention, the shaft 502, the bracket mechanism 504 and the distance adjustment mechanism 210' can be said to constitute to a body of the distance adjustment device 202'.

Within these non-limiting embodiments of the present invention, the distance "P" between the position of the plenum 129 relative to the movable platen 104 can be adjusted in the following manner. A technician (or another representative of an entity managing the molding system 100), first, actuates the locking member 508 into the sliding arrangement. This can be achieved, for example, by turning clockwise the nut of the first locking member adjustment actuator 606a. Once the locking member 508 is actuated into the sliding arrangement, the shaft 502 can be slid along the sliding slot 506. This can be achieved, for example, by actuating the first shaft adjustment actuator 604a or the second shaft adjustment actuator 604b, depending on a desired direction F or B (FIG. 6), as has been explained herein above. Then, once the desired position of the shaft 502 is achieved, the locking member 508 is actuated into the locked arrangement. This can be achieved, for example, by turning clockwise the bolt of the second locking member adjustment actuator 606b. Accordingly, the distance "P" between the plenum 129 and the take-off plate 128 can be adjusted. A technical effect of these embodiments of the present invention may include ability to accommodate production of preforms having a different length.

The description of the embodiments of the present inventions provides examples of the present invention, and these examples do not limit the scope of the present invention. It is to be expressly understood that the scope of the present invention is limited by the claims only. The concepts described above may be adapted for specific conditions and/or functions, and may be further extended to a variety of other applications that are within the scope of the present invention. Having thus described the embodiments of the present invention, it will be apparent that modifications and enhancements are possible without departing from the concepts as described. Therefore, what is to be protected by way of letters patent are limited only by the scope of the following claims:

The invention claimed is:

1. A molding system, the molding system including a take-off plate coupled to a fixed platen of the molding system, the take-off plate for removing molded articles after they have been molded; the molding system comprising,
    a movable platen configured to reciprocate along an operational axis of the molding system relative to the fixed platen;
    a treatment sub-system comprising:
        a treatment device coupled to and depending from the movable platen in a direction traverse to the operation axis of the molding system,
        a distance adjustment device configured to adjust a distance between the treatment device and the take-off plate along the operation axis of the molding system;
the distance adjustment device comprising:
a body defining:
a movable platen engagement interface configured for attachment to the movable platen;
a plenum engagement interface configured for attachment to the treatment device;
a distance adjustment mechanism attached to the movable platen engagement interface and the plenum engagement interface, the distance adjustment device configured to be selectively slidable along the operational axis of the molding system to selectively fix a position of the treatment device relative to the movable platen in a desired position along the operational axis of the molding system.

2. The molding system of claim 1, wherein said distance adjustment mechanism comprises at least one slot defined in said body.

3. The molding system of claim 2, wherein said movable platen engagement interface comprises a plurality of fasteners configured to be passed through said at least one slot so as to engage the movable platen.

4. The molding system of claim 1, wherein said plenum engagement interface comprises a plurality of bores defined in said body configured to cooperate with a plurality of bores defined in a mounting structure of a plenum and a set of fasteners.

5. The molding system of claim 1, wherein said plenum engagement interface comprises a shaft having an end portion, and wherein said distance adjustment mechanism comprises:
a locking member;
a bracket mechanism configured to accept said end portion and said locking member.

6. The molding system of claim 5, wherein said locking member comprises a wedge member; and wherein said wedge member is actuatable between a sliding arrangement and a locked arrangement, whereby in said sliding arrangement said wedge member permits said end portion to be slid relative to said bracket mechanism and in said locked arrangement said wedge member fixes said end portion in the desired position.

7. The molding system of claim 6, wherein said distance adjustment mechanism further comprises a plurality of distance adjustment actuators.

8. The molding system of claim 7, wherein said plurality of distance adjustment actuators comprises:
a shaft adjustment actuator; and
a locking member adjustment actuator.

9. The molding system of claim 8, wherein said shaft adjustment actuator comprises a first shaft adjustment actuator and a second shaft adjustment actuator; and wherein said first shaft adjustment actuator actuates said shaft in a first direction and wherein said second shaft adjustment actuator actuates said shaft in a second direction.

10. The molding system of claim 9, wherein said first shaft adjustment actuator comprises a stud and a nut and wherein said second shaft adjustment actuator comprises a bolt; and wherein an end of said first stud is configured to engage a portion of the shaft.

11. The molding system of claim 8, wherein said locking member adjustment actuator comprises a first locking member adjustment actuator and a second locking member adjustment actuator, and wherein said first locking member adjustment actuator actuates said locking member in a first direction and wherein said second locking member adjustment actuator actuates said locking member in a second direction.

12. The molding system of claim 11, wherein said first locking member adjustment actuator comprises a stud and a nut and wherein said second locking member adjustment actuator comprises a bolt; and wherein an end of first stud is configured to engage a portion of the locking member.

13. The molding system of claim 6, wherein said bracket mechanism comprises:
a bracket body;
a first bracket slide and a second bracket slide coupled to said bracket body;
said bracket body, said first and second bracket slides jointly defining a sliding slot for said end portion.

14. The molding system of claim 13, wherein said bracket mechanism further comprises a side plate coupled to said bracket body and said first and second bracket slides.

15. The molding system of claim 14, wherein said distance adjustment mechanism further comprises:
a shaft adjustment actuator; and
a locking member adjustment actuator; said shaft adjustment actuator and said locking member adjustment actuator being receivable through said side plate.

16. The molding system of claim 15, wherein said shaft adjustment actuator comprises a first shaft adjustment actuator and a second shaft adjustment actuator; and wherein said first shaft adjustment actuator actuates said shaft in a first direction and wherein said second shaft adjustment actuator actuates said shaft in a second direction.

17. The molding system of claim 16, wherein said first shaft adjustment actuator comprises a stud and a nut and wherein said second shaft adjustment actuator comprises a bolt; and wherein an end of said stud is configured to engage a portion of the shaft.

18. The molding system of claim 17, wherein said locking member adjustment actuator comprises a first locking member adjustment actuator and a second locking member adjustment actuator, and wherein said first locking member adjustment actuator actuates said locking member in a first direction and wherein said second locking member adjustment actuator actuates said locking member in a second direction.

19. The molding system of claim 18, wherein said first locking member adjustment actuator comprises a stud and a nut and wherein said second locking member adjustment actuator comprises a bolt; and wherein an end of said stud is configured to engage a portion of the locking member.

* * * * *